(12) United States Patent
Logan et al.

(10) Patent No.: US 7,769,364 B2
(45) Date of Patent: Aug. 3, 2010

(54) ON DEMAND VOICE MAIL RECORDING SYSTEM

(76) Inventors: James D. Logan, 23 Currier Rd., Candia, NH (US) 03034; Caren Thornburgh-Logan, 23 Currier Rd., Candia, NH (US) 03034

(*) Notice: Subject to any disclaimer, the term of this patent is extended or adjusted under 35 U.S.C. 154(b) by 949 days.

(21) Appl. No.: 10/984,018

(22) Filed: Nov. 8, 2004

(65) Prior Publication Data

US 2005/0153729 A1    Jul. 14, 2005

Related U.S. Application Data

(63) Continuation-in-part of application No. 10/160,710, filed on May 31, 2002, now Pat. No. 6,816,577, and a continuation-in-part of application No. 10/680,643, filed on Oct. 7, 2003, now Pat. No. 6,996,402, and a continuation-in-part of application No. 10/160,711, filed on May 31, 2002, now Pat. No. 6,788,766.

(60) Provisional application No. 60/295,469, filed on Jun. 1, 2001, provisional application No. 60/295,404, filed on Jun. 1, 2001.

(51) Int. Cl.
*H04M 11/10* (2006.01)

(52) U.S. Cl. ............... 455/413; 455/412.1; 455/412.2; 379/68; 379/81; 379/82; 379/84; 379/88.08; 379/88.18

(58) Field of Classification Search ............ 455/412.1, 455/412.2, 413, 414.1, 415, 417, 420, 550.1, 455/556.1, 556.2; 379/67.1, 75, 85, 88.18, 379/68, 81, 82, 84, 88.08

See application file for complete search history.

(56) References Cited

U.S. PATENT DOCUMENTS

| 4,645,879 | A | * | 2/1987 | Simmons | 379/355.01 |
|---|---|---|---|---|---|
| 4,876,717 | A | * | 10/1989 | Barron et al. | 726/5 |
| 4,926,461 | A | * | 5/1990 | Kuok | 379/88.27 |
| 4,941,167 | A | * | 7/1990 | Cannalte et al. | 379/88.26 |
| 5,022,069 | A | * | 6/1991 | Chen | 379/67.1 |
| 5,249,217 | A | * | 9/1993 | Lee | 455/412.1 |
| 5,544,231 | A | * | 8/1996 | Cho | 379/88.24 |
| 5,859,898 | A | * | 1/1999 | Checco | 379/88.01 |
| 5,995,824 | A | * | 11/1999 | Whitfield | 455/412.1 |
| 6,222,909 | B1 | * | 4/2001 | Qua et al. | 379/88.22 |
| 6,668,044 | B1 | * | 12/2003 | Schwartz et al. | 379/68 |
| 6,697,841 | B1 | * | 2/2004 | Sheffield et al. | 709/206 |
| 6,987,841 | B1 | * | 1/2006 | Byers et al. | 379/88.17 |
| 7,194,078 | B2 | * | 3/2007 | Stumer | 379/201.12 |

FOREIGN PATENT DOCUMENTS

| GB | 2295522 | A | * | 5/1996 |
|---|---|---|---|---|
| GB | 2318702 | A | * | 4/1998 |

* cited by examiner

*Primary Examiner*—Stephen M D'Agosta
(74) *Attorney, Agent, or Firm*—Charles G. Call

(57) ABSTRACT

A cellular telephone handset stores audio files previously recorded by the user as well as voice mail messages from other users and selectively transmitted selected ones of these files to the remote listener, or to the voice mail system of a remote user. Voice mail messages are composed, stored, transmitted, forwarded and reviewed using a voice mail system without ringing the remote party's telephone, much as email is composed, stored, transmitted and reviewed using an email server.

12 Claims, 5 Drawing Sheets

ON DEMAND VOICE MAIL RECORDING SYSTEM

CROSS-REFERENCE TO RELATED APPLICATION

This application is a continuation in part of, and claims the benefit of the filing date of co-pending U.S. patent application Ser. No. 10/160,710 filed May 31, 2002 which was published as U.S. application Publication No. 2002/0181671 A1, which will issue as U.S. Pat. No. 6,816,577 on Nov. 9, 2004, and which claimed the benefit of the filing date of Provisional U.S. Patent Application Ser. No. 60/295,469 filed on Jun. 1, 2001.

This application is also a continuation in part of, and claims the benefit of the filing date of co-pending U.S. patent application Ser. No. 10/680,643 filed on Oct. 7, 2003 which is a continuation in part of U.S. patent application Ser. No. 09/651,542 filed Aug. 29, 2000 issued as U.S. Pat. No. 6,631,271 on Oct. 7, 2003 and of U.S. patent application Ser. No. 10/160,711 which was filed on May 31, 2002, which was published on Dec. 5, 2002 as U.S. patent application Publication No. 2002/0181684 A1, which issued as U.S. Pat. No. 6,788,766 on Sep. 7, 2004, and which claimed the benefit of the filing date of Provisional U.S. Patent Application Ser. No. 60/295,404 filed on Jun. 2, 2001.

The disclosures of each of the above-noted applications and of U.S. Pat. Nos. 6,631,271, 6,788,766 and 6,816,577 are incorporated herein by reference.

FIELD OF THE INVENTION

This invention relates to cellular telephones and more particularly to methods and apparatus for transmitting prerecorded phrases, sounds and messages to a remote listener during a telephone conversation.

BACKGROUND OF THE INVENTION

When engaged in a telephone conversation, cellular phone users are typically confronted with the need to alert the person with whom they are speaking that, because others are nearby, the conversation cannot continue in privacy or without annoying others. In that case, the very act of explaining the problem can itself be awkward or impractical. In consequence, it would be desirable to incorporate into a cellular telephone the ability to transmit a pre-recorded message to the remote party by a pressing a button or actuating some other control on the cellular telephone.

Cellular telephones with built in audio recording and playback capabilities have been developed for performing functions including the recording and playback of dictation and telephone conversations, as well as the playback of pre-recorded announcements used to implement voice mail systems. Where such the voice recording and playback devices are already present in the cellular telephone, the needed additional functionality contemplated by the present invention can be added at little additional cost.

For example, U.S. Pat. No. 6,029,063 issued to Parvulescu et al. describes a voice scratchpad implemented in a wireless telephone that allows the user to record important information gathered during a phone conversation. The wireless telephone includes signal processing means and memory means for recording at least one message or memo, which is spoken over the telephone. The telephone also includes controls for initiating the recording of such a memo and for retrieving and replaying the memo. Indexing may be included which allows the system to record and replay a plurality of memos. The user of the phone can thus record important information in a memo on the voice scratchpad without the need for paper or the concentration and effort required for writing.

Automatic telephone answering systems have also been developed for use with cellular phones which allow the cellular phone operator to place the phone in an automatic answering mode in which the phone answers the incoming call and automatically transmits a message to transmit specific instructions to the caller at the distant telephone. U.S. Pat. No. 5,790,957 issued to A. H. Heidari describes a cellular phone which includes a prompt transmitter which may be used to advise the person at a distant telephone to wait a moment while the cellular phone operator proceeds to another location wherein it is appropriate to lift the receiver and begin speaking. The prompt feature avoids the situation wherein a telephone caller may hang up prematurely before the intended called person has a chance to pick up the receiver and begin conversing.

The foregoing systems do not, however, allow the cellular phone operator to employ the cellular phone's pushbutton controls to select and transmit a selected pre-recorded message to a caller during a conversation. In addition, it would be desirable to allow the cellular phone operator to transmit a repertoire of short response messages (e.g. "Yes," "No," "Maybe," and "I don't know.") that allow the remote party to ask questions to and then obtain responses from the cellular phone operator without requiring the cellular phone operator to speak.

A related problem occurs when a cellular phone user is unable to complete a call to send important information to a remote party before the cellular phone user needs to attend a meeting or otherwise be unable to conveniently complete the call. In that instance, it would be desirable to record a message to be transmitted later, along with a telephone number to be called, so that the cellular phone can later automatically place a call to that number and transmit the recorded message to the answering party, without requiring attention from the cellular phone operator.

In some cases, the need to transmit a spoken message from a cellular phone in private cannot be foreseen. It would accordingly also be desirable to provide means for storing a keyboarded message (which may consist of only one or just a few words) as text, and then employing speech synthesis to convert the keyboarded message into a spoken audio transmission that is sent to the remote party.

BRIEF SUMMARY OF THE INVENTION

As contemplated by the invention, the cellular telephone preferably includes a digital memory for storing digitized voice signals and means for capturing spoken messages using the cellular phone microphone and storing those messages as a digital recording in the digital memory. Alternatively, spoken messages may be recorded using the cellular phone microphone and stored a digital memory located remotely from the cellular phone, such as in a server provided by the cellular network or an addressable server accessed via the Internet. The pushbuttons or keys provided on the cellular telephone are then manipulated by the operator to selected one of the pre-recorded messages for transmission to the remote caller.

The cellular telephone keypad may be used to accept keyboarded message identification labels that may later be displayed as menu items on the cellular telephone's display to facilitate the identification and selection of previously recorded messages. In addition, the keypad and display may be used to compose text message that may later be converted into spoken audio form for transmission to a remote telephone.

The present invention may be employed to provide "On Demand Voice Mail." It may be observed that the above-described mechanism for recording labeled messages and then selectively playing them during an ongoing conversation may be considered to be a mechanism for time shifting outgoing content. On Demand Voice Mail (ODVM) is a mechanism for time shifting incoming messages. ODVM addresses the problem which occurs when a party to a conversation needs to terminate the call, but has not yet received all of the information needed from the other party. Now, the party might instruct the other party to "Call me back, and I won't answer, and then leave rest of your message in my voicemail".

To meet that need, ODVM permits a party to turn on audio recording capability, then hangs up (or otherwise terminate or interrupt the ongoing conversation) and allow the other party to continue to record a message for later playback. If one party places his or her cell phone into a recording mode before banking up, the connection is automatically terminated after the other party completes the recording. Thus, of a party is half way through a call and runs out of time, he or she can effectively flip the person with whom the conversation is being held into voice mail where they could finish whatever they were talking about. Leaving directions, instructions, or phone numbers would be the most practical examples.

The stored messages may be recorded in the voice of the caller, or may be selected from a stored library of pre-recorded audio messages, sound files, MIDI music files, or may comprise text data which can be converted to speech. These stored messages may either be entered by the caller, provided as standard stored text, which is converted to spoken form using speech synthesis.

The pre-recording audio or text messages stored in the digital memory may be selectively transmitted either during an ongoing telephone conversation at the request of the cellular phone operator, or by entering a telephone number to be called and associating that number with one or more messages and then, after a predetermined time interval or at a predetermined scheduled time, initiating the transmission of the identified message(s) when a telephone connection is successfully established between the cellular phone and the associated phone number.

Using a suitable control code in combination with a destination phone number, a connection may be directly established with the voice mail storage system for the destination phone number, without ringing the phone designated by the destination phone number. Pre-recorded messages, including previously received voice mail messages, may be directly transferred into a designated voice mail mailbox at the destination phone number.

During or at the termination of an ongoing phone conversation, one of the parties may be directly connected to the voice mail system of the other party, permitting a portion of the conversation, or a recorded message created after the conversation, to be stored as a voice mail recording.

A user may define and store one or more rules defining detectable conditions and further defining the action to be performed when the defined condition is satisfied, and the action may include the transmission of a recorded message to a defined destination phone number or to a specified voice mailbox.

These and other features and advantages of the invention may be better understood by considering the following detailed description.

DETAILED DESCRIPTION

Figure 1:
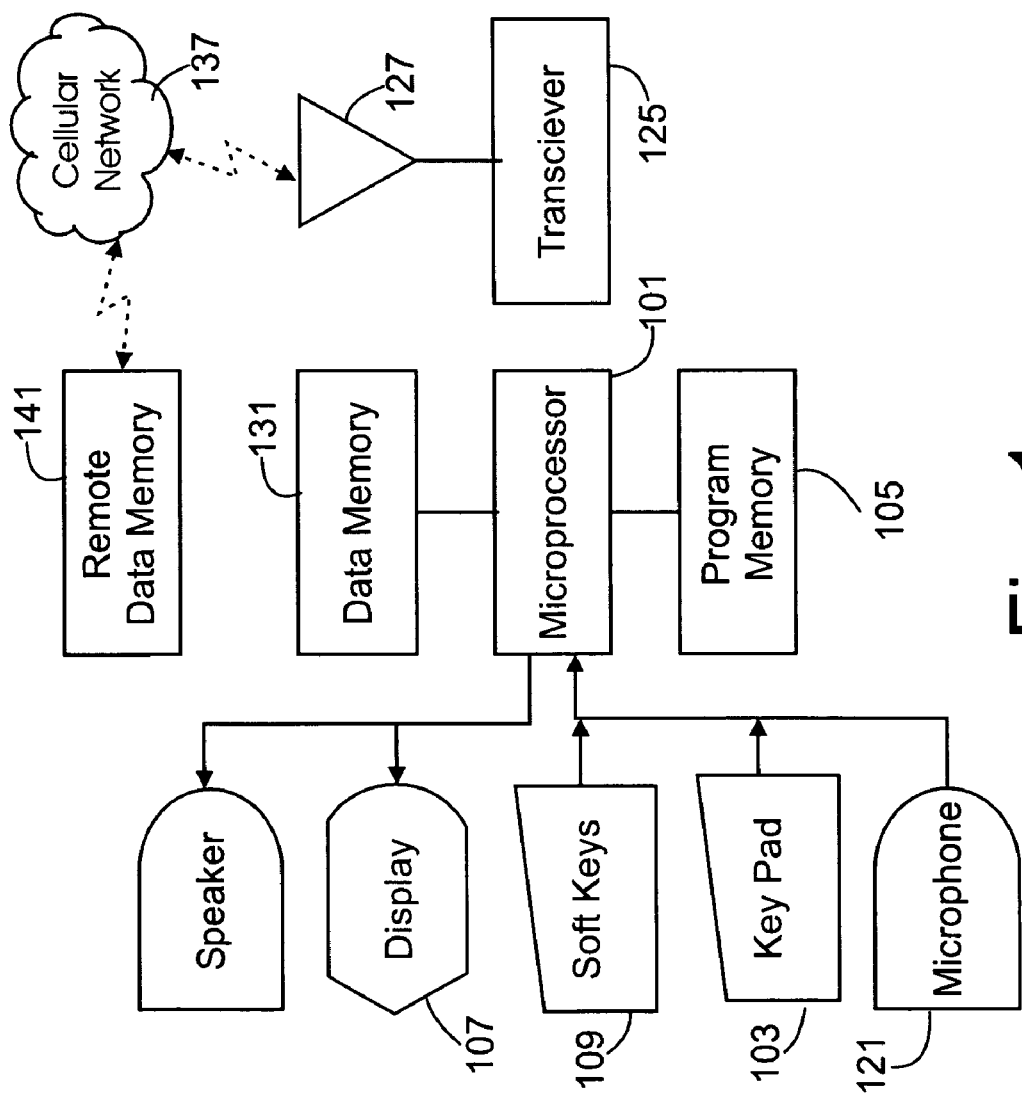
FIG. 1 is a block diagram illustrating the principal components of the cellular telephone that are used to implement the present invention.

As described below, the invention may be used to particular advantage in connection with a cellular telephone and may be implemented using conventional components of the type commonly used in advanced cellular phone systems. The makeup and organization of these components is illustrated in FIG. 1 of the drawings and consists of a microprocessor 101 that executes routines initiated by the operator's manipulation of a keypad 103. Pressing a given key on the keypad 103 initiates a routine defined by a stored program in the program memory 105. The cellular phone further includes a display 107 that typically takes the form of a small, backlit LCD panel. The panel may be used to display a menu of items that may be selected by the user using "soft keys" seen at 109 that are visually associated with the displayed menu items. U.S. Pat. No. 5,737,394 entitled "Portable telephone apparatus having a plurality of selectable functions activated by the use of dedicated and/or soft keys" describes the manner in which both the dedicated keys of a keypad and soft keys may be used in combination to implement a menu driven control arrangement for a cellular telephone. Alternatively, as will be described in more detail in connection with FIGS. 2-3 of the drawings, the functions performed may be displayed as a list of options and cursor keys may be used to invoke selected functions and submenu's identified on the display 107.

The cellular telephone further includes a microphone 121 for capturing spoken voice signals from the operator, a speaker or earpiece 123 for delivering audible sounds to the operator, and a cellular transceiver 125 for sending and receiving radio frequency transmissions to and from the cellular telephone system via the antenna 127.

The microprocessor 105 includes analog-to-digital conversion means for converting analog voice signals from the microphone 121 into digital form for storage in a data memory 131. In addition, using a text-editing program stored in program memory 105, the keypad 103 may be used to compose text messages, which are stored as character data in the data memory 131.

Figure 2:
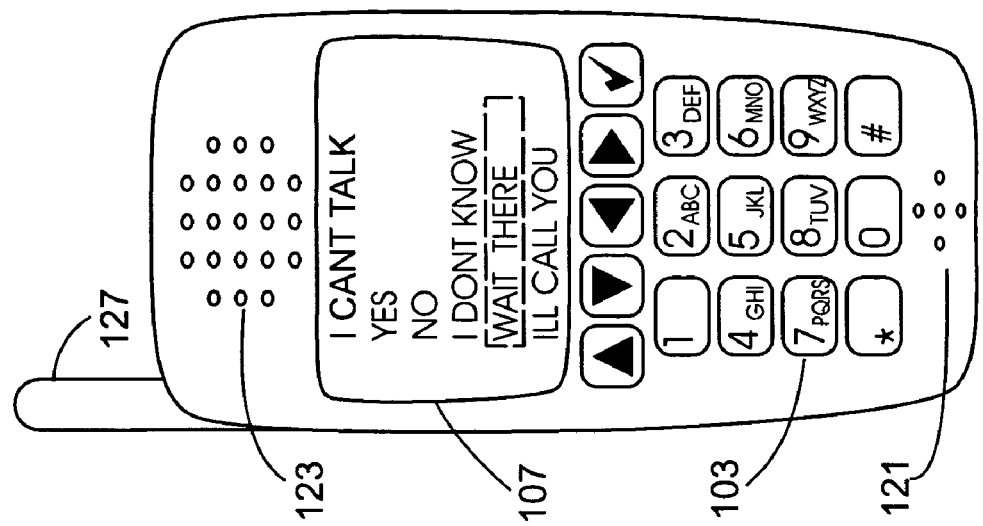
FIG. 2 illustrates the exterior of a cellular telephone handset that includes a keypad and display which enables the user to control the recording, identification, selection and transmission of recorded messages.

FIG. 2 shows the exterior of an illustrative cellular telephone handset which houses the components shown in the block diagram of FIG. 1. The handset uses a conventional numeric keypad 103 for dialing and softkeys whose function depends on the content shown on the display 107. The softkeys include an UP cursor key 211, a DOWN cursor key 212, a LEFT cursor key 213, a RIGHT cursor key 214, and an OK key 215.

When a menu screen is displayed, the cursor keys 211-214 are used to highlight a selected one of several displayed labels, and the OK key 212 is used to invoke the operation designated by the selected label. For example, as seen in FIG. 2, the display screen 107 may display a scrollable listing of labels each of which specifies a particular one of a collection of prerecorded messages. By pressing the UP and DOWN cursor keys 211 and 212, the user may highlight a selected label on the scrollable list, and may select the highlighted message by pressing the OK key 215.

The cursor keys enable the user to select and transmit prerecorded messages to a calling party when it is inappropriate for the cellular phone user to speak, such as when the phone "rings" in a silent "vibrate" mode when the user is in a meeting or a theater. In these situations, the user may select and transmit a desired message to send to the calling party using the cursor keys without disturbing others. In some situations, however, such as recording spoken messages or entering text messages, voice commands may be used to advantage. The program memory 105 may include voice recognition routines for converting spoken commands into interface commands for selecting and initiating functions. In order to differentiate conventional speech from voice commands, a selected soft key or dedicated key, or a unique spoken command, may be used to place the device in voice command mode. In voice command mode, the user may select and invoke a particular function by speaking the word or words corresponding to one of the displayed labels. To enter a text message, the user may speak the names of letters, numerals and punctuation marks. In each case, because the total vocabulary of acceptable spoken commands is limited, a speech recognition program of limited capability of the kind now commonly incorporated in cellular telephones to implement voice commands may be used.

Figure 3:
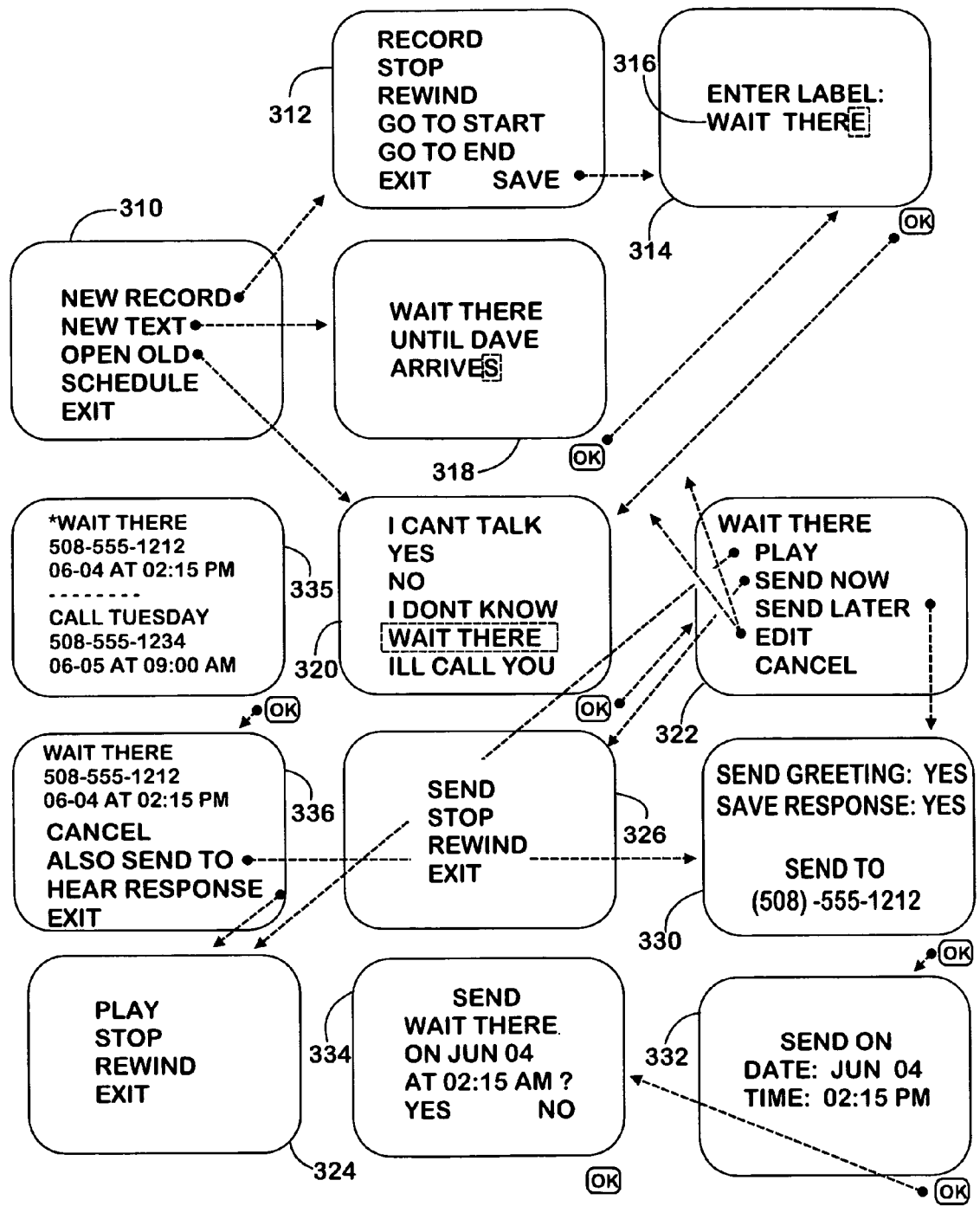
FIG. 3 illustrates the interrelationship of a collection of displayed selection menus which may be used by the operator to perform functions contemplated by the invention.

As contemplated by the present invention, the programs stored in the program memory 105 enable the operator to initiate and perform a number of interrelated functions, any one of which can be performed by beginning with "message menu" seen at 310 in FIG. 3.

By using the UP and DOWN cursor keys 211 and 212, the user may highlight the label NEW RECORD on the message menu 310. When the OK key 215 is pressed, the recording control menu 312 is displayed. When the label RECORD is selected on menu 312, the microprocessor 101 digitizes and stores the sounds received by the microphone 121 in the handset's data memory 131. While recording is in process, the user can highlight and select labeled functions on the recording control menu 312 to STOP the recording, REWIND the current recording by an incremental amount and begin replaying the recording at an earlier point, or may select GO TO START or GO TO END to move to the start or end of the current recording. Again selecting RECORD on the menu 312 causes the system to begin recording again at the currently selected playback point, overwriting the prior recording from the playback point forward. The user can abandon the recording session by highlighting and selecting the EXIT label or may select the SAVE label on the menu 312 to display the label entry dialog screen 314 seen in FIG. 3.

As noted earlier, the messages stored in the handsets data memory 131 may alternatively be stored in a server 141 accessed via the cellular network as illustrated at 137, or on a remote file server which can be accessed via the Internet. New messages may be temporarily stored in the handset's data memory 131 when created, and then may be transferred to a remote server for permanent storage. The messages and other audio files available on the remote server may be transmitted during an ongoing telephone conversation by transmitting keypad commands to the remote server. Alternatively, messages may be transferred from the remote to the cellular handset for storage in the data memory 131 when the cellular phone is idle or via an unused channel when the cellular phone is in use.

Using the record control menu 312, the user may a spoken message (or other sound, such as a musical selection) captured by the microphone 121 and stored as digital data in the data memory 131 or a remote server 141. This data may be stored in compressed form to minimize the amount of memory space required. The messages created by the operator and recorded in this fashion for future use may supplement a library of standard messages that are "built into" the cellular phone and recorded, for example, in the read-only non-volatile program memory 105, downloaded from a library available on a remote server, or transmitted during an ongoing conversation by transmitting control signals from the cellular phone handset to the server.

A library of pre-recorded messages may provided in non-volatile program memory 105 or on a remote server 141. These messages may be associated with pre-recorded, displayable text labels, eliminating the need for the user to key in descriptive labels. The pre-recorded messages may be spoken by professional announcers or famous people, and the same message content may be recorded in several alternative voices selectable by the user.

The displayable label text which describes each recorded message is typically stored as character data in the data memory 131 or the program memory 105. When audio files are being transmitted between the local data memory 131 and a remote server 141 via the cellular network, the audio files may be transmitted as compressed digital data, and the character data making up the descriptive labels may also be transmitted via the cellular network using a data channel such as the TCP (Transmission Control Protocol) channel available to many digital cellular telephones, such as Motorola's iDEN i730 multi-communication device which provides a conventional, bidirectional audio voice communications channel as well as the additional TCP data communications channel. The iDEN i730 includes a built in processor with software support for the Java 2 Platform, Micro Edition, also known as the J2ME™ platform which enables developers to easily create a variety of applications, as described in the *i730 Multi-Communication Device J2ME™ Developer's Guide*, Motorola Corp. (2003).

One or more recorded audio files in the library, including spoken messages recorded by the user, may be played through the handset's speaker to provide announcements, alerts or alarms. By way of example, the following announcements might be recorded in the voice of a famous person or persons: "You have an incoming call." (played instead of a ring tone); "Rise and shine, it's time to get up!" (played instead of clock alarm); "The battery is charging."; or "Powering down. Goodbye." These functional messages may be recorded by the user and labeled in the same way as the messages intended for playback during conversations, as described next.

The label entry dialog screen 314 enables the user to enter a short descriptive label which describes the recording created while the recording control menu 312 was being displayed. The label may be created by using the LEFT and RIGHT cursor keys to highlight a particular character position in a sixteen (16) character entry field seen at 316. With the desired character position selected, the user may then use the UP and DOWN cursor keys to scroll through a list of characters, numerals and punctuation marks. When the desired character is displayed, a LEFT or RIGHT cursor key is pressed to advance the highlighted position to the next or any different position in the 16 character field. When the desired label has been entered, the OK key is pressed to store the created recording as a named audio file in the data memory 131 and to display a new list of the available message files in the available recording menu seen at 320. The descriptive label text entered using the label entry dialog screen 314 describes the content of the recorded audio message or sound. The descriptive label may also be used as the spoken name label that allows each message to be identified by voice command. Pressing the OK key when no characters have been entered returns the display to screen 312 (or to screen 318 if entered from the text editor screen 318 to be described next).

By selecting the label NEW TEXT on the message menu 310, the user may invoke the operation of text editor program stored in the program memory 105 that displays the text editor screen 318 which permits the operator to enter and edit a text message. Individual character positions in the text are entered in the same way that characters are entered on the field 316 of the label entry dialog screen 314: that is by using the LEFT and RIGHT cursor keys to highlight a particular character position in the text (which, in the text editor screen 318, may occupy multiple lines) and by using the UP and DOWN cursor keys to select a particular character from a scrollable set of characters to be displayed at the selected position.

To facilitate entry into the character field 316 or the text editor screen 318, the user may press one of the keys on the dialing keypad seen at 103 in FIGS. 2 and 3 which has the effect of limiting the scrollable list of available characters from which a particular character is desired using the UP and DOWN cursor keys. For example, pressing the "5-JKL" key on the keypad restricts the list of characters selectable using the UP and DOWN keys to "5", "J", "K", and "L", thus speeding character selection.

Pressing the OK key from the text editor screen displays the label entry dialog screen 314 to permit the user to enter a descriptive label for the text message. As in the case of spoken messages, text messages created and saved by the user may supplement built-in pre-recorded text messages stored in read-only non-volatile memory.

When the available recording menu 320 is displayed, the user may press the UP and DOWN cursor keys to scroll through the list of available messages to highlight a particular desired message, and then press the OK key 215 to display the message action menu 322 seen in FIG. 3. The message identification label selected using menu 320 is displayed at the top of the message action menu 322. The user then selects a particular function to be performed with respect to the selected message. When the selected message is a recorded audio file, the file may be played back or transmitted as previously recorded. When the selected message is a text message it is converted to a spoken message using speech synthesis during transmission or playback. If the selected message is a text message and if the remote station is transmitting a facsimile tone signal, the message may be converted to a facsimile message such that it is reproduced in text form at the remote location.

By selecting the label PLAY on message action menu 322, the user starts the playback (audible on to the handset user) of the selected message while displaying the playback control menu 324. The options on the playback control menu allow the user to STOP the playback until PLAY is pressed again, REWIND the message recording to the beginning and restart the playback, or EXIT to abort the playback. If the message is allowed to playback to its conclusion, the playback control menu display is continued for a brief, predetermined period to provide the user with an opportunity to select REWIND to repeat the playback, and then terminates, returning the handset to normal operation.

By selecting SEND NOW on the message action menu 322, the selected message begins to play at the beginning and is audible both the user and the remote party. During message transmission, the send control menu 326 is displayed and operates like the playback control menu 324 (except that SEND rather than PLAY is displayed). By selecting STOP, the user can terminate (or pause) the transmission, which can be resumed by selecting SEND. By selecting REWIND, the user can repeat the transmission. If the complete message is transmitted to its conclusion, the playback control menu display is continued thereafter for a brief, predetermined period to provide the user with an opportunity to select REWIND to repeat the transmission, and then terminates, returning the handset to normal operation. When the message is being transmitted to the remote listener, the mute buttons on the cellular telephone (not shown), or an additional MUTE menu command on the screen 326, can be activated so that the user can speak when others are in the room without the user's speech being transmitted. Otherwise, transmitted messages are overlayed as background sounds on anything the user might say over the cellular telephone connection. In addition, a further "speaker off" control can be added to suppress all sound from the speaker 123 to prevent annoying sounds from being emitted when the user is in a theater or a similar situation and is being used to transmit prerecorded audio recordings. In addition, the user may simply "hang up" while a recording is being transmitted, and the recorded transmission will then continue until its conclusion, when the cell phone will automatically hang up.

By selecting SEND LATER on the message action menu 322, a first transmittal dialog screen 330 is displayed, requesting the user to specify whether or not a greeting is to be sent before the selected message, and whether or not the remote listener is to be given the opportunity to record a response to the message which is then saved in the handset's data memory for later playback. The user uses the LEFT and RIGHT cursor keys to highlight the option fields to the right of the SEND GREETING and SAVE RESPONSE, and uses either the UP or DOWN cursor keys to toggle the field between the YES, NO and NEW options. Whenever the NEW option is set for either option field, the unit displays the record control screen 312 to accept the recording of a new greeting or response prompt in the voice of the handset user. For example, a typical recorded greeting might contain the spoken words "THIS IS JOHN DOE. SORRY I CAN'T SPEAK TO YOU IN PERSON NOW, BUT PLEASE LISTEN TO THE FOLLOWING PRERECORDED MESSAGE." An illustrative response prompt might contain the following spoken words "YOU MAY RECORD A RESPONSE TO THIS MESSAGE BY SPEAKING AT THE SOUND OF THE TONE. PRESS THE STAR KEY TO END YOUR RESPONSE. THANKS."

After the greeting and response options are selected, the user enters the telephone number to which the message is to be sent using send-to dialog screen 330. The desired telephone number is simply keyed on the keypad 103 after the LEFT and RIGHT cursor keys are used to highlight the telephone number field.

When the desired telephone number has been entered, the OK button is pressed to display a time-to-send entry screen 332. The entries for the date field may be entered using the UP and DOWN cursor keys to select the month (which, by default, is the current month), then using the UP and DOWN keys to select a day of the month (which by default is the current day of the month). The year need not be displayed and is presumed to be the current year for the current month and day, or any subsequent date in the calendar year, and is presumed to be the next following year for any earlier date. When either the time or date is correct, that field can be exited and another edited by using the LEFT and RIGHT cursor keys. Pressing the OK indicates the displayed date and time are acceptable, and causes the confirmation screen 334 to be displayed. The confirmation screen summarizes the entries made on screens 330 and 332 and requests the user to confirm that the selected message should be sent to the designated number at the specified time and date. If the user selects "YES" and presses the OK button, the message transmission is scheduled. Otherwise, the attempt to designate a message for future transmission is aborted.

By selecting the SCHEDULE label on the message menu 310, the user can display a listing of messages scheduled for transmission as seen at 335. The schedule list menu 335 presents a scrollable listing of messages scheduled for transmission, with each on being listed by its identifying label, the telephone number to which it is to be sent, and the date and time when it is scheduled for transmission. Messages which have already been successfully transmitted may be flagged on the listing with a first icon, and messages to which the remote listener has recorded a response may be identified with a different icon (such as the asterisk to the left of the WAIT HERE message identifying label shown on screen 335.

Using the UP and DOWN cursor keys to select a particular message and pressing the OK button on screen 335 causes the scheduled message menu 336 to be displayed. Using menu 336, the user can elect to CANCEL the scheduled transmission or can elect ALSO SEND TO which displays the telephone number entry screen 330, the date and time entry screen 330, and the confirmation screen 334 in sequence, making it easy to send a copy of the same message to different parties at different times. Selecting EXIT at the menu 336 leaves the schedule unchanged. At the time specified, the designated number is called and, if a connection is established, the recorded message is transmitted to the called party.

To help insure that this automated call is properly received, a pre-recorded, standard greeting message may transmitted before the message recording or text to identify the caller and explain that a prerecorded message is about to be transmitted as discussed above with reference to screen 330. The prompt message may indicate whom the call is for and/or ask the receiving party to indicate that he or she is ready to accept the message by pressing a designated key. The cellular phone then responds by sending the recorded message only when the proper DTMF dialtone signal is keyed at the remote telephone and received at the cellular phone in response to the prompt message. If the called number is equipped with a telephone answering system which answers the call instead of a human, the cellular phone may employ its voice recognition capability to transmit the same or a different message only after the answering mechanism at the other end is ready to record. The presence of voice recognition capability also makes it possible to match the voice of the person answering the telephone with the stored voice characteristics of the desired party and to transmit the previously recorded message only if the desired party answers the phone. The cellular telephone may be programmed to attempt to call the same number later when the called telephone does not answer or properly indicated that it is ready to receive the transmission.

A specified pre-recorded message file may be associated with one or more telephone numbers which, if identified by the caller ID mechanism for an incoming call, cause that message file to be played as a special greeting or message to the identified caller or callers. Thus, the following sort of self-explanatory special messages might be played on the receipt of an incoming call from an identified caller: "Thanks for calling. Today's meeting has been moved to the Boston Office and we will begin at noon;" "Bob, call me on my cell phone at (508) 555-1212;" or "This is a recording. I am no longer accepting your calls. Don't call again."

The special greeting file selected in accordance with the caller's caller ID information may also invite the caller to leave a voice mail message using the "On Demand Voice Mail" capability described below. When the caller leaves an on-demand voice mail message, all or part of the prompt greeting message may be recorded with the recorded voice mail message from the caller, thereby providing context to the recorded response when the voice mail recipient plays back the message.

The pre-recorded "message files" need not be limited to spoken messages. Music and other sounds may be recorded and uploaded for replay and transmission using the cellular phone. The cellular phone could further include stored routines for performing music synthesis; that is, converting uploaded and stored MIDI music files into audible form. The text-to-speech capabilities of the processor, used to transmit keyboarded messages in spoken form as described above, may be used to listen to email text files in spoken form and to send or forward email messages as voice file attachments to email messages. In this way, the user may retrieve incoming email from an ISP and replay or retransmit the content as spoken text.

Pre-recorded message files may also take the form of text messages which are transmitted for display on a target device. The Wireless Messaging API (WMA) allows compatible devices such as SMS cell phones to send and receive short text or binary messages over wireless connections. The WMA is based on the Generic Connection Framework (GCF) defined by the Connected Limited Device Configuration (CLDC). The GCF provides an abstract framework for performing input and output, a framework that profiles and optional packages can build on to provide the i/o connections they need. Messages sent and received with the WMA are meant to be transmitted over the wireless networks used by cellular telephones and similar devices, whether GSM or CDMA. In particular, the WMA supports the Short Message Service (SMS) and the Cell Broadcast Short Message Service (CBS). Pre-recorded SMS messages or the like may be transmitted during an ongoing conversation, or as greeting messages, or as announcement and alarm messages, either alone or in combination with recorded audio messages.

Similarly, many cellular phones and other devices such as PDAs include the ability to transmit, receive and display images. These pre-recorded image files may be transmitted instead of, or to supplement, audio or text message files to perform, or enhance the performance of, the same functions described in this specification accomplished with pre-recorded audio files.

The handset may also be programmed to send a standard spoken prompting message to the called party after the message transmission is concluded indicating that a spoken response may be provided. For example, the prompt might say: "IF YOU WISH TO RESPOND TO THIS MESSAGE, PLEASE SPEAK AT THE SOUND OF THE TONE. PRESS THE STAR KEY WHEN YOU HAVE FINISHED." If the called party records a response, it may be accessed by first selecting the transmitted message using the schedule menu 335 and then selecting the HEAR RESPONSE label (displayed only when a response has been recorded).

The handset described above may be employed to transmit one or more recorded messages to several different phone numbers. Thus, a message may be recorded and then transmitted in separate telephone calls to each telephone number. Thus, for example, if it became necessary to reschedule a meeting to a different time, a single advisory message could be dictated and transmitted to all of the meeting attendees, and the transmitted message could include a request that the recipient dictate a reply indicating whether or not the recipient expected to attend.

Sound files obtained from a variety of sources may be stored and shared among a community of friends or associates by using the telephone communications device to store sound files and share them with others. Excerpts from songs, movie sound tracks, and other works, which are made available by the copyright owners for promotional purposes, could be freely shared. Along with jokes, animal sounds, MIDI music files, or other entertaining sound clips, these short recordings could be collected and shared with others. File sharing may be achieved by providing both parties to a conversation with menu controls that allow the connected phones to be placed in a "sharing mode" and then allowing either party to select and transmit a stored message. Start and end tones may be transmitted to delimit the transmitted message, and the descriptive text label may also be transmitted with the message so that the recipient who is receiving and storing a message being shared by another party need not re-key the label text.

Recorded messages may also be recorded, labeled and played whenever an incoming caller establishes a new connection to the handset. The caller-ID information which identifies the incoming caller may be used to selectively trigger the playback of a selected message on to a specified caller or callers. In this way, a user may record a message providing personal information to selected callers, such as family members or other trusted people, that would not be made available to other callers, who might hear a different pre-recorded message selected by the cell phone owner for automatic playback.

In the same way, recorded messages may be grouped and each message group might be associated with one or more specified phone numbers which are captured either when an outgoing call is initiated or when an incoming call containing caller ID information is received. Thus, for example, during an ongoing conversation with a family member, the labels for one set of available messages might be displayed in the display panel 107, whereas during a business phone call with identified business partners, a different set of pre-recorded messages would be presented to the user for playback.

On Demand Voice Mail

The present invention may be employed to provide "On Demand Voice Mail." It may be observed that the above-described mechanism for recording labeled messages and then selectively playing them during an ongoing conversation may be considered to be a mechanism for time shifting outgoing content. On Demand Voice Mail (ODVM) is a mechanism for time shifting incoming messages. ODVM addresses the problem which occurs when a party to a conversation needs to terminate the call, but has not yet received all of the information needed from the other party. Now, the party might instruct the other party to "Call me back, and I won't answer, and then leave rest of your message in my voicemail".

To meet that need, ODVM permits a party to turn on audio recording capability, then hang up (or otherwise terminate or interrupt the ongoing conversation) and allow the other party to continue to record a message for later playback. If one party places his or her cell phone into a recording mode before hanging up, the connection is automatically terminated after the other party completes the recording.

Thus, of a party is half way through a call and runs out of time, he or she can effectively flip the person with whom the conversation is being held into voice mail where they could finish whatever they were talking about. Leaving directions, instructions, or phone numbers would be the most practical examples.

Alternatively, if one party gets another call through call waiting, the second caller, or the first, could be transferred to voice mail. Note that, to permit concurrent recording of one call while continuing another, the recording function would be performed by the cellular service provider in the same way that voice mail is recorded when the called party is unavailable. In this case, on party sends a signal to the cellular provider (by selecting a displayed "transfer to voice mail" option on his or her cell phone) to transfer the caller to voice mail. In a conventional PSTN telephone system, the central office could be directed to connect the other party to voice mail by sending a predetermined DTMF dial sequence, an SS7 signal, or the like. When the transfer occurs, the other party may be treated in the same way that any other caller who is transferred to voice mail; that is, may be hear a pre-recorded greeting message and be given options which enable the recording process to be controlled. In the meantime, the terminating party may discontinue use of his or her phone, or may use it to communicate with someone else. In the same way, after one of two callers has been sent to voice mail during a call-waiting interruption, the second caller may also be sent to voice mail, and the two different callers may continue to concurrently record messages.

When a remote party has been transferred to on-demand voice mail and is recording a message, the cellular phone user may monitor the remote party's recording of a stored voice mail message, and continue the conversation after the recording is completed, may converse with another party and then rejoin the party recording the message thereafter.

ODVM could employ tones, beeps or pre-recorded messages as prompts. Thus, when one phone user needs to interrupt a call, a pre-recorded explanatory message is selected for playback and gives the other party the option of recording any additional information to be conveyed as on-demand voice mail. Alternatively, the user could advise the other party that he or she was about to be switched to voice mail, and a "beep" or tone would be transmitted to indicate to the party when to begin the recording.

If a called party cannot, or chooses not to, start or continue a conversation, a pre-recorded message is played to the other party. The person receiving the recording, however, can then say something back in response. The interrupted party could continue to "listen in" to the recording, even though he or she may be unable to speak (because they are in a meeting or at the theatre, for example).

When a pre-recorded "prompt" is transmitted before the other party is given an opportunity to record a response, both the prompt and the response may be recorded as the part of the same "voice mail" message, thus providing context when the message is played back.

The mechanism for playing back a selected recording to an incoming caller may include an "over-ride" capability that allows the called party to encourage the use of voice mail, but permits the caller to "insist on" a connection. Thus, the called party might place his or her phone in a mode in which incoming calls (perhaps from specified callers only) are answered with a greeting that says "I'm in a meeting but if this is important, press #2 and I'll pick up". The caller can then press the number, which is displayed on your phone, and you then start the important conversation. In essence, the combination of caller ID, and the pre-recorded message transmission capability, in combination with this reply feature provides a call screening function often performed by a human secretary.

On-demand voice mail functions, as described above, are initiated by the person to whom the voice mail message is directed, with the message itself being left at the request of, or at least the consent of, the person recording the message. On-demand voice mail functions could also be initiated by the person who wishes to leave the message without the need for dialing the number of the party for whom the message will be left. Whenever, during an ongoing call, a cellular phone user is unable or unwilling to continue a conversation and transmits a stored, labeled voice announcement to the other party, the other party may be given the option of transmitting a DTMF key sequence, or making an interpretable voice command, to request access to voice mail recording. This request could also be for a limited time after a call had been completed by providing the functional equivalent of a "postscript" button that would establish a voice mail connection that would the permit the requester to leave a voice mail message for the person with whom a conversation had recently terminated. This capability thus provides a "soft ending" for a call; that is, within a brief period, say 30 seconds, after then end of a call, a caller could invoke the postscript function to initiate a recording connection to the other party's voice mail.

The ability to directly invoke another party's voice mail system can be implemented without requiring that a voice connection be established (or attempted) first. Frequently, if a party does not wish to interrupt another person with a telephone call, it would desirable to simply invoke their voice mail system directly without "ringing" the other party's phone. This could be accomplished by transmitting a predetermined DTMF key sequence, SS7 signal, or some other signal, along with a destination telephone number, which the central office, PBX or dialed stationset (such as a suitably equipped cellular phone with internal message storage) would respond to by connecting the calling party to a voice mail recording system without ringing the destination phone.

As described above, On Demand Voice Mail may be used to advantage when a party to is unable or unwilling to continue a conversation, providing a mechanism for allowing the other party to continue to record information that the terminating party can replay later. Sometimes, it would be desirable to simply record an ongoing conversation, capturing recordings from both parties, for later replay. To facilitate that result, a party may be given the ability to switch the ongoing conversation into voice mail, and continue in that mode until the call terminates or until the voice mail mode is terminated by a further command, thus leaving the designated content in the requester's voice mail system for later playback.

To facilitate this function, the recording capabilities built into a cellular phone could be used to permit the phone user to first compose, and possibly edit a stored voice mail message, and then transmit this voice mail message by transmitting a coded signal and a destination number as noted above to transfer the recorded message into the voice mail system of a called party. The voice mail system owner may, at his or her option, be notified by an audible or visual alert signal when a voice mail message has arrived. Note also that the usual greeting message, e.g. "You've reached the Jones residence. We can't take your call right now, so please leave a message . . . " may be inappropriate or unnecessary; consequently, the voice mail system may simply respond with a "beep" and nothing more to signal the human caller (or the automated message transfer system) when to begin the recording.

As an adjunct to caller-initiated access to another's voice mail system, when a direct connection to an on demand voice mail system is established, access may be provided to previously recorded messages, allowing the caller to delete, amend or supplement previously recorded messages. This access would be provided based on the calling parties caller ID information, and could require the entry of a password whenever the calling party first leaves a message, and the reentry of that password whenever a calling party seeks access to replay or edit a previously recorded message. The calling party could be provided with the displayed menu controls of the type shown at 324 in FIG. 3 to play, stop and rewind messages being replayed.

Voice mail messages may also be listed like any other recorded message is listed as illustrated at 320 in FIG. 3. Voice mail messages which store recordings of messages left by another party, or portions of prior conversations, could be labeled on the displayed list using a combination of the caller ID information and time of day information. These voice mail and conversation messages could then be replayed during other ongoing conversations, transmitted as on demand voice mail messages to the other person's voice mail systems. Using the ability to combine a recorded message with a further recording from another person, the system permits messages to be forwarded to others and chained together, in much the same way that email messages are chained together by appending a copy of a received into the body of a transmitted message so that the chain of prior messages can be read in later messages. With chained on demand email, a sequence of voice mail messages and responses can be chained together to form a recording of an ongoing conversation.

The on demand voice mail system can accordingly provides many of the convenient features of email communications. One party can record a voice mail message by directly accessing another party's voice mail system. That party can listen to the voice mail message, compose a reply, and directly respond by sending a response voice mail directly to the caller's voice mail system. A message requesting a response can be transmitted directly into several different voice mail systems identified on a destination list, and each recipient can dictate a response which can be posted as an on demand voice mail response directly into the first person's voice mail system. Either party can combine a received recording with an additional recording and forward it to a third party's voice mail system. Received voice mail messages appear in a displayed listing and can be readily selected for replay, for transmission during an ongoing conversation, for editing, or for transmission directly into other voice mail systems.

The Web of Rules

As described in the above-noted U.S. application Ser. No. 10/680,643 filed on Oct. 7, 2003 and in U.S. Pat. No. 6,631, 271 entitled "Rules Based Methods and Apparatus for Generating Notification Messages based on the Proximity of Electronic Devices to One Another," one or more specified functions may be performed in response to the changing relative positions of a plurality of objects, each of which incorporates or is attached to a device that can be identified at short range. One or more processing rules are defined by a user. Each of the rules contains condition part and an action part, with the condition part defining at least one relative position condition to be satisfied by specified ones of said objects and the action part defining at least one specified action to be performed when said condition part is satisfied. One or more detectors generate data indicating the identification and relative position of electronic devices that are within range of the detectors. This data is processed in accordance with the processing rules defined by the user, and functions are performed as specified in the action part of each of the rules whose condition part is satisfied by the data from the detector(s).

The detectors operate as interrogation devices capable of determining whether specified ones of the objects are within a predetermined range of the interrogation device, and may be implemented by Bluetooth compliant integrated circuits, by radio frequency identification (RFID) tag readers, or by devices which obtain position information from devices using the Global Positioning System (GPS).

One of the objects may be a container which holds one or more objects, and the condition part of a rule may define one or more relative position conditions to be satisfied by the position of the container relative to said one or more objects specified in the rule. An identification token, such as a card or a badge, may be issued to a designated bearer and the condition part of a rule may define a position condition to be satisfied by the position of the identification token relative to one or more other devices. This rule-based, location dependent system may used to advantage in a wide range of programmable applications defined using a standard user interface which a user employs to define the condition and action parts of rules which control a variety of defined functions in response to the changing relative positions of specific objects identified in the rules.

The action part of a user-defined rule may specify the content and destination of a message to be delivered when the condition or conditions specified in the action part is/are satisfied. This message may be a labeled, pre-recorded audio message stored either in a cellular phone handset or in a remote file server as discussed above and transmitted during on ongoing conversation which is occurring when the condition is satisfied, or may be transmitted to a called party after a connection is established to that party by dialing a telephone number specified in the action part of the satisfied rule.

Figure 4:
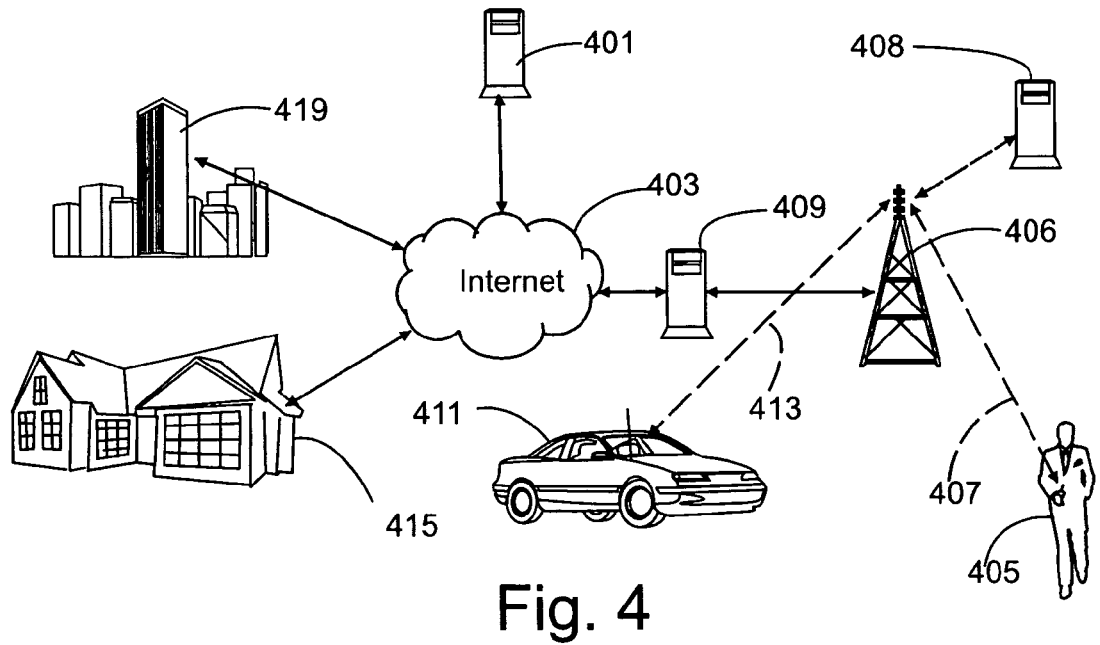
FIG. 4 is a schematic view illustrating a network of electronic devices which utilize the present invention.

Using the rule-based system, the relative locations of a network of electronic devices, each including an electronic device whose absolute or relative position can be sensed, are monitored to generate notification signals in accordance with user-defined rules. An illustrative example of such a network is shown in FIG. 4. Supervisory functions for the system are executed on a server 401 which is connected via the Internet 403 to a plurality of different fixed and portable electronic devices which employ Bluetooth chips, RFID tags and tag readers, or other radio frequency devices to sense the relative location of devices in the network as well as provide connectivity between the devices.

For example, the user seen at 405 uses a hand held cellular phone which is connected to the Internet 403 using a cellular network or Wireless Application Protocol (WAP) radio link 407 and a gateway server 409. Similar, the user's automobile 411 employs a second cellular or WAP link 413 and the gateway 409 to connect to the Internet. Additional electronic devices, such as personal computers, at the user's home 415 and office 419 are also connected to the Internet via conventional means, including dialup and fixed connections to Internet Service Providers (ISPs).

Each of the foregoing devices are thus provided with Internet connections and each is further provided with a Bluetooth chip which enables that device to communicate over short ranges to still further devices (not shown in FIG. 4). For example, the user 415 may carry additional devices, such as a laptop computer or a personal device assistant (PDA), an electronic wristwatch, a remote control for an automobile door lock, a digital camera, or an electronic calculator. Each of these devices may be equipped with a Bluetooth chip which can communicate with other devices, including the user's cellular phone which includes a Bluetooth chip that enables it to also operate as a short range intercom device and as a portable phone when it is the vicinity of a base station at the user's home 415 or office 419.

The user's automobile 411 is also equipped with a cellular phone system capable of establishing data communications via the WAP gateway 109 and the Internet 403 to provide information, entertainment, and communications services to the occupants. The automobile may be further provided with a navigation system using the Global Positioning System (GPS), a diagnostic system capable of generating, displaying and transmitting status information about the automobile, The automobile's car locking system may employ a Bluetooth enabled transceiver to remotely control door and truck locks, lights, and anti-theft alarms.

At the user's home 415 and at his or her office 419, Bluetooth enabled devices may be integrated into a variety of fixed systems, including thermostats, appliances, entertainment systems, lighting controls, security systems, and office equipment. Although the Bluetooth chips in these devices may be primarily intended for different functions, they can play a useful role in the position monitoring and notification system contemplated by the present invention, a described below.

The invention may be advantageously applied to business as well as consumer applications. For instance, an engineer who customarily takes instruments and tools into the field may use the system to prevent these devices from being misplaced or forgotten. By using the user-defined rules for monitoring the relative and absolute positions of various devices, in combination with user-defined actions which should be performed when associated conditions are satisfied, the system can be tailored to the needs of the particular user and the specific devices which that user owns and operates.

Bluetooth Functions

As described in Profiles, Specification Volume 2, Specification of the Bluetooth System, V1.0B, Dec. 1, 1999, under the Generic Access Profile, two devices involved in a Bluetooth communication can take the roles specified by the generic notation of the A-party (the paging device in case of link establishment, or initiator in case of another procedure on an established link) or the B-party (paged device or acceptor). The A-party is the one that, for a given procedure, initiates the establishment of the physical link or initiates a transaction on an existing link.

The Bluetooth access profile establishes the procedures between two devices related to discovery and connecting (link and connection establishment) for the case where none of the two devices has any link established as well as the case where (at least) one device has a link established (possibly to a third device) before starting the described procedure. The Bluetooth user should, in principle be able to connect a Bluetooth device to any other Bluetooth device. Even if the two connected devices don't share any common application, it should be possible for the user to find this out using basic Bluetooth capabilities.

Each Bluetooth device is specified by a unique 48-bit (12 hexadecimal digit) Bluetooth Device Address (BD_ADDR) and by a "user friendly" Bluetooth Device Name which can be up to 248 bytes long, although external devices are not expected to be able to handle or display more than 40 characters. Still further, each device is assigned a Bluetooth passkey (Bluetooth PIN) which is used to authenticate two Bluetooth devices (that have not previously exchanged link keys)

to each other and create a trusted relationship between them. The PIN may be entered through a user interface device and may also be stored in the device; e.g. in the case of a device without sufficient capability for entering and displaying digits.

Bluetooth devices are further specified by a Class of device parameter received during the device discovery procedure and indicating the type of device and which types of service that are supported. The information within the Class of Device parameter is referred to as 'Bluetooth Device Class' (i.e. the major and minor device class fields) and 'Bluetooth Service Type' (i.e. the service class field). The terms for the defined Bluetooth Device Types and Bluetooth Service Types are defined in the specification. The Class of device is a bit field and, at the user interface level, the information in the Class of device is implementation specific. Bluetooth devices are capable of performing an inquiry function to determine the identity and Device Class of other "discoverable" Bluetooth devices which are in range. With respect to inquiry, a Bluetooth device shall be either in non-discoverable mode or in a discoverable mode; that is, the device shall be in one, and only one, discoverability mode at a time. The two discoverable modes defined here are called limited discoverable mode and general discoverable mode. When a Bluetooth device is in non-discoverable mode it does not respond to inquiry. A Bluetooth device is said to be made discoverable, or set into a discoverable mode, when it is in limited discoverable mode or in general discoverable mode. Even when a Bluetooth device is made discoverable it may be unable to respond to inquiry due to other baseband activity. A Bluetooth device that does not respond to inquiry for any of these two reasons is called a silent device.

Bluetooth devices are capable of perform different types of inquiries called a (1) general inquiry, (2) limited inquiry, (3) name inquiry, (4) device discovery, and (5) bonding. The purpose of the general inquiry procedure is to provide the initiator with the Bluetooth device address, clock, Class of Device and used page scan mode of general discoverable devices (i.e. devices that are in range with regard to the initiator and are set to scan for inquiry messages with the General Inquiry Access Code). Also devices in limited discoverable mode will be discovered using general inquiry. The general inquiry is intended to be used by devices that need to discover devices that are made discoverable continuously or for no specific condition.

The purpose of the limited inquiry procedure is to provide the initiator with the Bluetooth device address, clock, Class of Device and used page scan mode of limited discoverable devices. The latter devices are devices that are in range with regard to the initiator, and may be set to scan for inquiry messages with the Limited Inquiry Access Code, in addition to scanning for inquiry messages with the General Inquiry Access Code. The limited inquiry is intended for use by devices that need to discover devices that are made discoverable only for a limited period of time, during temporary conditions or for a specific event.

The purpose of name discovery is to provide the initiator with the Bluetooth Device Name of connectable devices (i.e. devices in range that will respond to paging). A Name request is the procedure for retrieving the Bluetooth Device Name from a connectable Bluetooth device. It is not necessary to perform the full link establishment procedure) in order to just to get the name of another device. In the name request procedure, the initiator will use the Device Access Code of the remote device as retrieved immediately beforehand normally through an inquiry procedure.

The purpose of device discovery is to provide the initiator with the Bluetooth Address, clock, Class of Device, used page scan mode and Bluetooth device name of discoverable devices. During the device discovery procedure, first an inquiry (either general or limited) is performed, and then name discovery is done towards some or all of the devices that responded to the inquiry. The built-in ability of a Bluetooth device to detect the presence and identity of other Bluetooth devices which are within its range may be used to provide location information which is then used, as described below, to generate useful notification messages to the user.

Figure 5:
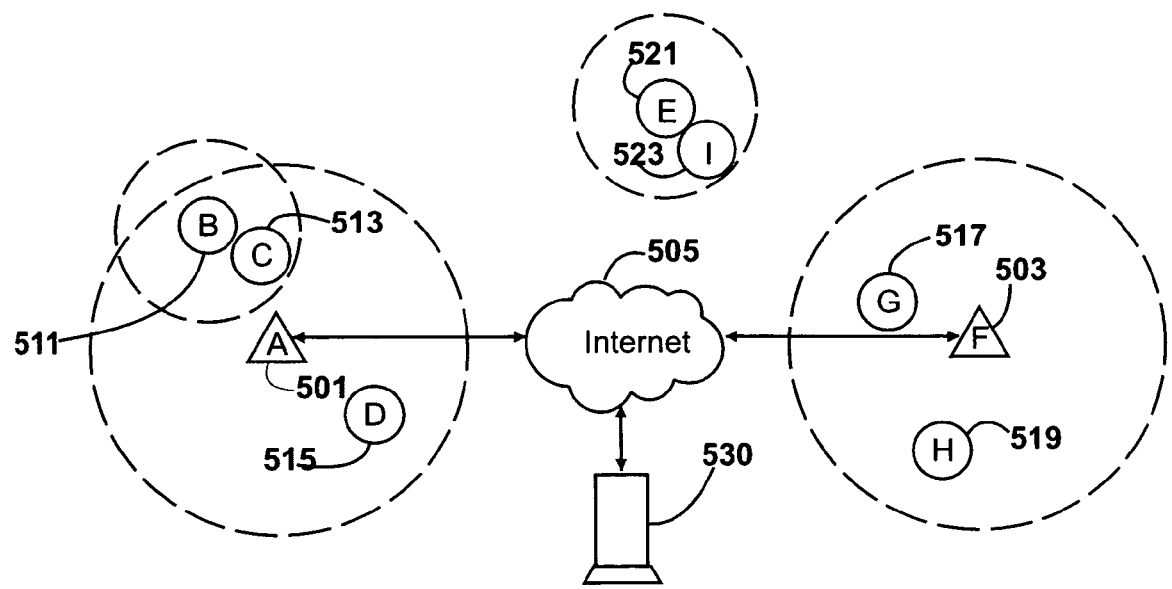
FIG. 5 depicts topological layout of a group of electronic devices, including device detectors, illustrating the operation of a rules-based, location-based device control mechanism.

An illustrative topology is shown by way of example in FIG. 5. As there shown, two fixed Bluetooth devices illustrated by the triangles A and F at 501 and 503 are each linked to the Internet as seen at 505, and both can operate in a long range mode. Thus, the device illustrated by the triangle A at 501 can discover the presence of and communicate with the Bluetooth devices illustrate by the circles B, C and D at 511, 513 and 515 respectively. The device indicated by the circle B at 511 operating in short range mode can detect the nearby device C at 513, but the device D at 515 is out of range for the device B. The devices indicated by the circle G at 517 and by the circle H at 519 are both within the range of the device F at 503. The device indicated by the circle E at 521 is out of the range of both the devices A and F, but is near to and can discover the presence and identity of device I at 523.

Those Bluetooth device which are programmable (e.g. personal computers, PDAs, and the like) may be readily programmed to detect and report the position of nearby devices. Thus, the device A may be programmed to detect the fact that devices B, C and D are within its range, that devices E, F, G, H and I are outside its range, and that device C is also within the range of device B but that device D is not within the range of device B.

A server seen at 530 is connected to the Internet, and hence to devices A and F. The server 230 receives HTTP messages from the remote devices A and F containing the position information obtained by transmitting Bluetooth inquiry messages from devices A and F, and by gathering position information obtained from satellite Bluetooth devices, such as the device B.

The server 530 executes a supervisory program which records the position information contained in received messages to establish state information at predetermined times. By comparing the state information at different times, transition events can be detected. Thus, if device B moves outside the range of device A, the time at which that movement occurred can be determined.

Other Range and Position Detection Systems

Other systems can be used to identify when particular objects are within a predetermined range of other objects. For example, identification tags which can be detected at short range are used in electronic article surveillance systems to prevent shoplifting and theft, warehousing and inventory control systems, article processing and inspection systems, and the like. Such systems are available from Unisen of Boca Raton, Fla.; Detectag of Aurora, Ontario, Canada; and Sensormatic of Boca Raton, Fla. Using these range-sensing, tagging mechanisms in combination with the user-defined rules contemplated by the invention, the user can tag articles which should be, or should not be, in particular places at particular times, as defined by the condition part of user-specified rules.

There are several different kinds of radio frequency identification (RFID) technologies and tags, each of which has significantly different functional characteristics. Some tags have batteries, some don't. Some tags have short-read ranges, some have long-read ranges. Popular tags operate on at least six different frequencies, often with many competing protocols at each frequency. To provide standards for identification tags, the EPC (Electronic Product Code) has been proposed to as a standard way of designating products, and packaging for products, in a range of retail supply chain application from "backroom" applications such as pallet and carton tracking to "selling floor" applications such as item level tagging. At its most basic level, EPC is a coding scheme for RFID data that will identify an individual item's manufacturer, product category and unique serial number. EPC tags are interrogated by tag readers which transmit the EPC code along with an identification of the particular reader to a server on the Internet which stores information that allows individual items to be tracked. Thus, for example, the server 530 may store tracking data for individual items made by a manufacturer. When the item is near a reader; for example, when an item bearing an RFID tag (device G at 507) is near a tag reader (device F at 503), that proximity information may be posted as tracking data to the server 530 via the Internet 530 using the standard EPC Network mechanism.

In addition to, or as an alternative to, the range finding abilities of a Bluetooth device, an article surveillance system, or the equivalent, an object whose position is to be tracked may incorporate a Global Positioning System (GPS) receiver for determining the absolute position in latitude and longitude for that device. For example, the GPS 25 series receivers available from Garmin Industries provide position information accurate to within 5 meters, velocity information accurate to 0.1 m/s RMS, are small in size (46.5 mm×69.9 mm×11.4 mm), and consume little power (115 mA typical @ 5.0 VDC). For details on the Global Positioning System and GPS receivers, see Understanding GPS: Principles and Applications by Elliott D. Kaplan (Editor), Artech House; ISBN 0890067937 (1996). Motorola offers the MG4100 Instant GPS chip that can detect GPS signals as low as −53 dBm, that can be readily added to virtually any portable consumer electronics product to provide position awareness. For example, digital cameras might stamp photos with time and location labels, PDAs can provide maps with real time navigation, and cellular phones that are E-911 compliant can offer emergency assistance, navigation, buddy finders, and location-based interconnections with others. Methods and apparatus for providing location dependent cellular telephone communications are further described in co-pending U.S. patent application Ser. No. 10/160,711 filed on May 31, 2002 and published on Dec. 5, 2002 as U.S. patent application Publication No. 2002/0181684 A1, the disclosure of which is incorporated herein by reference.

In addition, Mobile Positioning Systems (MPS) which are incorporated into cellular phone systems provide a mechanism for continuously or periodically updating location information for cell phones. MPS technology is similar to the satellite-based Global Positioning System (GPS) but offers the additional capability of determining location inside buildings, parking garages and other shielded areas such as inside a pocket or briefcase that are inaccessible to GPS systems. MPS Mobile Positioning Systems for GSM cellular phones are offered by Erickson and Cellpoint, Inc.

When a GPS or MPS device is used to determine absolute position, the user defined rules which determine when predetermined actions are performed may include absolute position requirements. For example, the GPS receiver in an automobile navigation system may be used to add a condition to the condition part of a rule which states "If my automobile is more than 2 miles from my house, and . . . "

In accordance with the invention, a rules-based system for monitoring the movement and relative location of a plurality of electronic devices, including Bluetooth compliant devices, RFID tags and RFID tag readers, and GPS devices, may be employed to perform specified actions, such as issuing notification messages and actuating alarms, when the conditions specified in one or more or the defined rules are satisfied. The notification messages may consist of pre-recorded spoken messages or audio files which are specified by unique labels or identifiers and which may be transmitted during an ongoing conversation at the time a condition is satisfied, or may be transmitted to a called party at a telephone number specified in the action part of the rule. RFID tag readers perform inquiry operations to identify RFID tags which are with range of the tag reader. The RFID tag readers may be connected in a network using the long-range communications capabilities of an included Bluetooth device, or via some other communication link. The current and past position of an item designated by an RFID tag which produces a standard EPC code may be determined using the standard EPC Network from an Internet server that stores tracking data for manufactured items. The positional data derived from these inquiries is passed to a rules processor which initiates defined actions when one or more of the rules are satisfied. A web server may be used to accept rules definitions, receive posted positional data from connected devices, and initiate the actions specified by the satisfied rules. Alternatively, user devices may be programmed to perform one or more of these functions. The present invention may be used to provide programmable functions by monitoring the relative locations of Bluetooth enabled or RFID tagged items that can be detected at short range to provide special electronic article surveillance functions to prevent shoplifting and theft, or to existing augment warehousing and inventory control systems, article processing and inspection systems, and the like. The Bluetooth enabled devices and the RFID tag readers are each coupled to a communications network, which may include the Internet, whereby position and identification information is passed to a processor which processes the supplied information in accordance with the previously defined rules. Some of the nodes of the network may act as relay stations, transferring device position and identification information from other nodes, or transmitting messages whose content and destination is specified by the action part of a rule whose conditions part has been satisfied.

The range and absolute position data from the network of electronic devices may be advantageously stored in a relational database and manipulated using standard query services and procedures. These query services process location data which may specify the geographic "point" position of fixed objects (without absolute position sensing means) or movable objects which are detected near to fixed objects, and movable object which use GPS or MPS mechanisms to determine current position. When precise data is unavailable, objects' positions may be approximated by specifying defined regions which contain the objects. Preferably, this location data is stored in a standard format, such as that used by the locator feature in Oracle8i interMedia, a component of the Oracle 8i database available from Oracle Corporation, Redwood Shores, Calif. This locator feature, and Oracle Spatial, and its extensions used with the Oracle8i Enterprise Edition product, provides an integrated set of functions and procedures that enables spatial data to be stored, accessed, and analyzed quickly and efficiently in an Oracle8i database. Oracle Spatial provides a SQL schema and functions that facilitate the storage, retrieval, update, and query of collec tions of spatial features in an Oracle8i database, and includes the following components:

a. A schema that prescribes the storage, syntax, and semantics of supported geometric data types;
b. A spatial indexing mechanism;
c. A set of operators and functions for performing area-of-interest and spatial join queries; and
c. Administrative utilities.

For more detailed information, see "Oracle8i interMedia Audio, Image, and Video User's Guide and Reference." Release 8.1., 5 Oracle Corporation (Oracle Part No. A67299-01), 1999, and Oracle Spatial User's Guide and Reference, Release 8.1.6, (Oracle Part No. A77132-01), 1997, 1999. The above-noted operators and functions, taken in combination with available Geographic Information System location databases, allow the user to specify conditions such as "near to 529 Sycamore Street, Des Moines, Iowa" which may be satisfied when a GPS device position is within a specified range of a geographic point location for that address obtained from a GIS database.

Rules Definitions

The supervisory program executing on the server 530 can further accept rules definition from a user. For example, using a conventional forms based HTML/CGI interface, the user may specify the conditions which are to be satisfied before certain actions may be taken. By way of example, the user may define rules with the goal of making sure a user does not forget to take certain devices with their person. These devices or things that people commonly carry with them and that have some value include a Palm Pilot, cell phone, wallet, keys, pocketbook, briefcase, and portable computer. Each of these items would be equipped with a Bluetooth chip. In addition, Blue Tooth chips could be integrated into a small device (here called a "badge") whose prime function is to indicate position and which can be could placed on or near stationary devices, such as the Palm docking station, or the cell phone recharger, with which Bluetooth devices or things bearing other Bluetooth badges could link to at times.

The "web of rules" of rules defined by the user could detect and inform the user of a rich variety of events. For instance, if the user's electronic watch was in proximity to her car during the day on Monday through Friday, then the user's cell phone and briefcase should also be in proximity to the car. That is, the cell phone and briefcase should be with the user when she is traveling, and the location of the watch signifies the location of the user. Thus, the user can define a rule which states that, if the watch is within the range of the car during business hours on Monday through Friday, and further if either the cell phone or the briefcase are not in the vicinity of the car at that time, the user should be alerted in of a variety of user-defined ways as described later.

As a further example, the user could establish the rule that if the user left the house (as determined by being out of range of the particular fixed device), and a house security system indicated that the doors were not locked, and if no other user was still present in the house, the departing user would be alerted.

The action taken when a give rule is satisfied can take numerous forms. In the foregoing example, the user can be notified by a actuating a suitable alarm on a device known to be with the user (e.g., by causing her watch it sound an audible alarm or to vibrate.). Other actions can be taken when a condition is satisfied. For example, when the user enters the car for the first time when the state information indicates a different person had formerly used the car, the cars seats could be automatically adjusted for the new driver. As another example, when the system indicated that the user had left her house or her office at particular times of day, the telephone system could be programmed to automatically start call forwarding calls to a different location, or to automatically select a different greeting message that callers would hear when the calls were unanswered.

Figure 6:
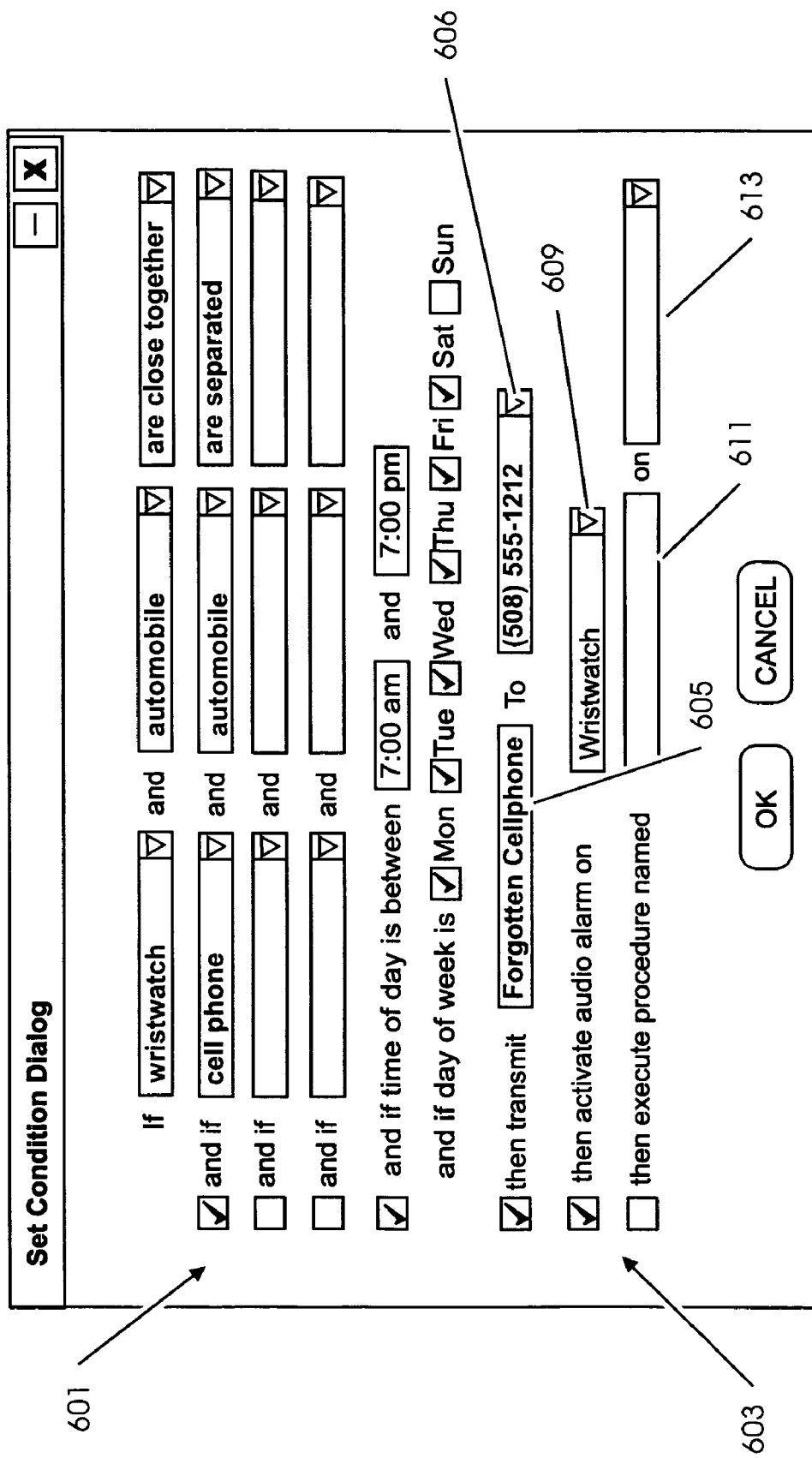
FIG. 6 is the screen layout of a user interface dialog box used to define one or more of the rules used to control the operation of the system.

The supervisory program executing on the server (seen at 401 in FIG. 4 and at 530 in FIG. 5) could also currently report the position of articles. Thus, if the user had neglected bring her car keys, she could consult a display on her cell phone provided from the server using via the PDAs WAP interface, which might inform her that her keys (and its Bluetooth car lock control) were within range of the television set (with its Bluetooth remote control) her bedroom. The rules can be defined by the user using an HTML forms-based interface on a Web server, or by running a program for accepting rules on one of the user's electronic devices, such as a personal computer. An example rule definition form is shown in FIG. 6. Each rule consists of up to four positional conditions as indicated generally at 601, each of which specifies two devices and each of which states whether that particular positional condition is satisfied when those two devices (1) are close together; (2) are separated, (3) have moved together, or (4) have moved apart. The first two possibilities can be determined by either of the devices issuing an inquiry to identify other electronic devices which are within its range, and the second two possibilities can be determined by comparing the current state of one of the devices with its prior state to determine which, if any, other devices have moved with range or have move out of range between states. In addition, the dialog form seen in FIG. 6 allows the user to state the time of day and the days of the week when the conditional test is to be performed.

As seen in FIG. 6, the illustrative HTML form further defines an action part at 603 which specifies functions to be performed when all of the conditions in the condition part of the rule are satisfied. The user can enter the text of a message to be displayed at 605 and specify the electronic device which is to display the message at 606. The message may be a recorded spoken message or audio file designated by a user-defined label that is entered at 605, and the destination device which produces the message may be the telephone number of a called party to who the specified recorded spoken message or audio file is transmitted after a connection is established the cellular or public switched telephone network (PSTN). The user can also specify that, if the condition part of the rule is satisfied, an audible alarm on a device specified at 609 may be activated; and/or the user can designated a named procedure at 611 to be performed on a programmable device identified at 613.

The rule-based system may be used to produce "place-based" alarms. The user may define a rule such as "If my wristwatch is at my office and the time of day is between 5:00 pm and 6:00 pm, then activate an audio alarm on my wristwatch." In this way, a reminder to leave the office on time is issued only if the user has not already left on time. As a further example, the user my record a reminder announcement on her GPS cell phone as a labeled message which plays "pick up your prescription" whenever the cell phone and the user's drug store "are close together." Note that such reminder and alarm messages might be posted by a person other than the bearer of a designated device; thus, a person's spouse might post a reminder message "Don't forget to stop for milk" which would be transmitted to a designated cellular phone when that phone moved away from the phone user's office.

The cellular phone with a built-in message recording and playback mechanism may also be used independently of the rule-based network to autonomously play recorded reminder and alert messages at particular times or, if also equipped with GPS or MPS position sensing, to automatically play recorded reminder or alert messages when the cellular phone arrives at or leaves a designated geographical location, or to generate an identified recorded message or activate an alarm when a specified combination of time and location conditions were satisfied.

The cellular phone could also be programmed to record and play back place-related audio notes. For instance, you might want to make a note regarding which hotel room to ask for next time you at a particular hotel, or which dish to order at a particular restaurant, where to park when in a certain part of town. As previously noted, these recorded reminder messages may be stored either in the cellular handset, in a cellular network server, on an Internet server which is accessible to the cellular phone, or on a nearby device coupled to the cellular phone by a Bluetooth link.

Note also that, although the foregoing illustrative examples employ a cellular phone with message recording and playback capabilities, similar functions may be performed by a device such as PDA which may be provided with audio file recording and playback capabilities, data storage and processing capabilities, and short and long range communications.

As described in detail in the above noted U.S. Pat. No. 6,788,766 which is incorporated herein by reference, a data server may be employed for facilitating communication between consenting participants via a telephone network. The data server stores cross-referencing data that specifies, for each of given participant, the current geographic location and the telephone number of each participant. New participants enter a group by sending a log-in message containing data specifying the current geographic location and the telephone number of the new participant. Any participant may then transmit a broadcast request specifying a geographic region within which a targeted subset of said participants are currently located, and broadcast an information message to that targeted subset of participants.

This mechanism for creating "talk groups" may be employed for automatically establishing connections between electronic devices which satisfy a particular rule. For example, when a participant's cellular phone entered or leaves a defined region, the user may be automatically logged into and out of a defined group, and pre-recorded announcements may be generated at the time of entry and exit which advise the user that group connectivity has been established.

This same technique could be used to automatically connect to a source of information related to a particular location: pre-recorded announcements may be played when the user's device is at a predetermined position, such as particular battle sites at Gettysburg, or points of interest around Niagara Falls. A cell phone user may be given the ability to automatically be connected to a "help desk" in a large retail store to obtain shopping assistance from assigned store personnel. This connection could use an "open-mike" conversation format in which, whenever the user speaks, all of the other group participants can hear them. A cell phone user with a headset could simply walk into a store and start talking to the clerks or information service. No more stationing kiosks or clerics all over the floor. Note that cellular phones or other devices with built-in short range signaling capabilities such as Bluetooth can automatically establish rule-based, location-based group communications among nearby participants without needing the cellular or dialup telephone network In some respects this capability is similar to the private intercom functionality is built into a basic cell phone service, but rather than establishing private communications between two parties, this system provides communications between all participants in the group which satisfy the rules defining the attributes of group members. Although these attributes may be location based conditions, they may be based on the attributes of participants; for example, creating discussion groups among all participants who share a common interest.

Group formation could be more than just based on where a user or device is currently located. These locations may be specified in a variety of ways, including using GPS and GIS map databases, as noted above. In addition, book-marking system could be employed whereby you can bookmark a location that you are currently at, and then refer back to it later. Marine GPS systems commonly include such a "man overboard" mechanism for marking a location to which the boat owner wishes to return.

Another useful action that a rule-based or location-based system can perform is to disable a designated device when a specified condition is satisfied. Thus, a cellular phone might be disabled unless it is near a designated wristwatch, effectively making the cell phone useful only by, or in the presence of, a particular person. Alternatively, a cell phone might be disabled when it is near to an automobile to prohibit unsafe use when driving, or it may be disabled when it is in a location that prohibits cell phone use, such as a theatre or other location designated by the user. Alternatively, the action part may merely disable the ringer, or switch it to vibrate mode, in certain locations, and return it to normal audible ringing mode upon departing from those protected locations. In the same way, a rule could be written to turn OFF the ringer, or disable or power down the phone or other devices at certain times of day when they are not needed, thereby conserving the battery supply.

The action part of a rule-based, including location-based, mechanism may identify pre-recorded DTMF (dialtone) signaling which can be transmitted via a cellular or dialup telephone link to control the state and function of a connected central office or cellular network provider. For example, most public telephone services offer a variety of service functions which can be controlled by transmitting predetermined dialpad key sequences. To use many of these functions, the user must normally know and key-in control key sequences on the telephone keypad. These key sequences can be recorded, labeled, and transmitted via the telephone link to perform a variety of functions, including: the activation and deactivation of call waiting services, the blocking and unblocking of caller ID displays, establishing call-forwarding functions. As a alternative to the use of DTMF key sequences to control telephone central offices, the SS7 call management protocol may be used. SS7 (Signaling System 7/Common Channel Signaling) is an advanced signaling system that features flexible message formatting, high speed data transmission (56/64 kbps) and digital technology. In the usual voice and signaling network, signaling and voice use the same path but cannot use it at the same time. With SS7, signaling and voice have been separated. Signaling (SS7) is over a high-speed data link which carries signaling for more than one trunk. In the context of the present invention, the SS7 protocol provides a more direct and effective way for the host services computer to control the functions of the connected dialup telephone system than the conventional DTMF signaling mechanisms which are set forth here for simplicity.

If the subscriber wishes to prevent the called party's caller ID system from displaying the subscriber's number on the next call, the dialtone sequence "*67" is sent to the central office. The sequence "*82" may be recorded and sent to remove perform line blocking for the next call only. Call waiting is activated (and deactivated) by sending the key sequence "*70" to the central office, and is deactivated by the sending same code. Call tracing functions can be performed by transmitting the dial sequence "*57" to the central office, which thereafter provides announcements to the subscriber indicating that the call was traced and providing further instructions. The central office may be requested to perform repeat dialing by sending the key sequence "*66". Repeat dialing by the central office may be deactivated on the request of the subscriber transmitting the dialtone sequence "*68" to deactivate central office repeat dialing.

Under the commonly available "three way calling" service offered by telephone system, when the user wishes to add a third party to an ongoing call, he or she may manually flash the line (i.e., places the line on-hook momentarily), waits for three beeps and a dial tone from the central office, then dials the number, and when the added party answers, again flashes the line to bring all three parties together for the desired conferenced call. If the third party line does not answer or is busy, the subscriber is notified of that condition and the line is flashed twice to reconnect the first call. These functions may be combined with pre-recorded telephone numbers to automatically create conference calls by selecting the recorded control sequence for playback, either manually or when the condition part of a rule is satisfied.

As noted above, using special dialtone DTMF sequences, SS7 signaling, or the like, pre-recorded message files may be transmitted directly into a destination voice mail system. Thus, the rule-based mechanism may be employed to automatically perform voice mail management functions. Thus, a cell phone user could record a message and define a rule which would cause the recorded message to be automatically transferred into the voice mail system of a particular person. For example, "If a product designated by EPC Code 123456789012 and EPC Reader 987654 are close together, send the message labeled "Your shipment arrived" to the voice mail of (508) 555-1212."

The various mechanisms which have been described above may be used to form a communications network for exchanging recorded messages in a variety of ways between a variety of communications devices including, by way of example:

(1) cellular phones seen at 703, 705 and 707 connected to the cellular telephone network 710;

(2) a server 713 connected to the cellular network 710 which stores and manages files, including messages, images and text, on behalf of cellular subscribers identified by cellular telephone numbers, as well as rules which specify conditions and actions defined by cellular subscribers;

(3) conventional telephones seen at 723 and 725 connected to the public switched telephone network 730;

(4) a server 731 connected to the PSTN 730 which stores and manages files, including messages, images and text, on behalf of cellular subscribers identified by conventional telephone numbers, as well as rules which specify conditions and actions defined by cellular subscribers;

(5) an answering machine 733 connected to the PSTN 730 which includes a processor and storage for files, including messages, images, text and rules;

(6) a personal computer PC 743 connected to the Internet 750; and (7) gateways 771, 772 and 773 which interconnect the cellular network 710, the PSTN 730 and the Internet 750.

Figure 7:
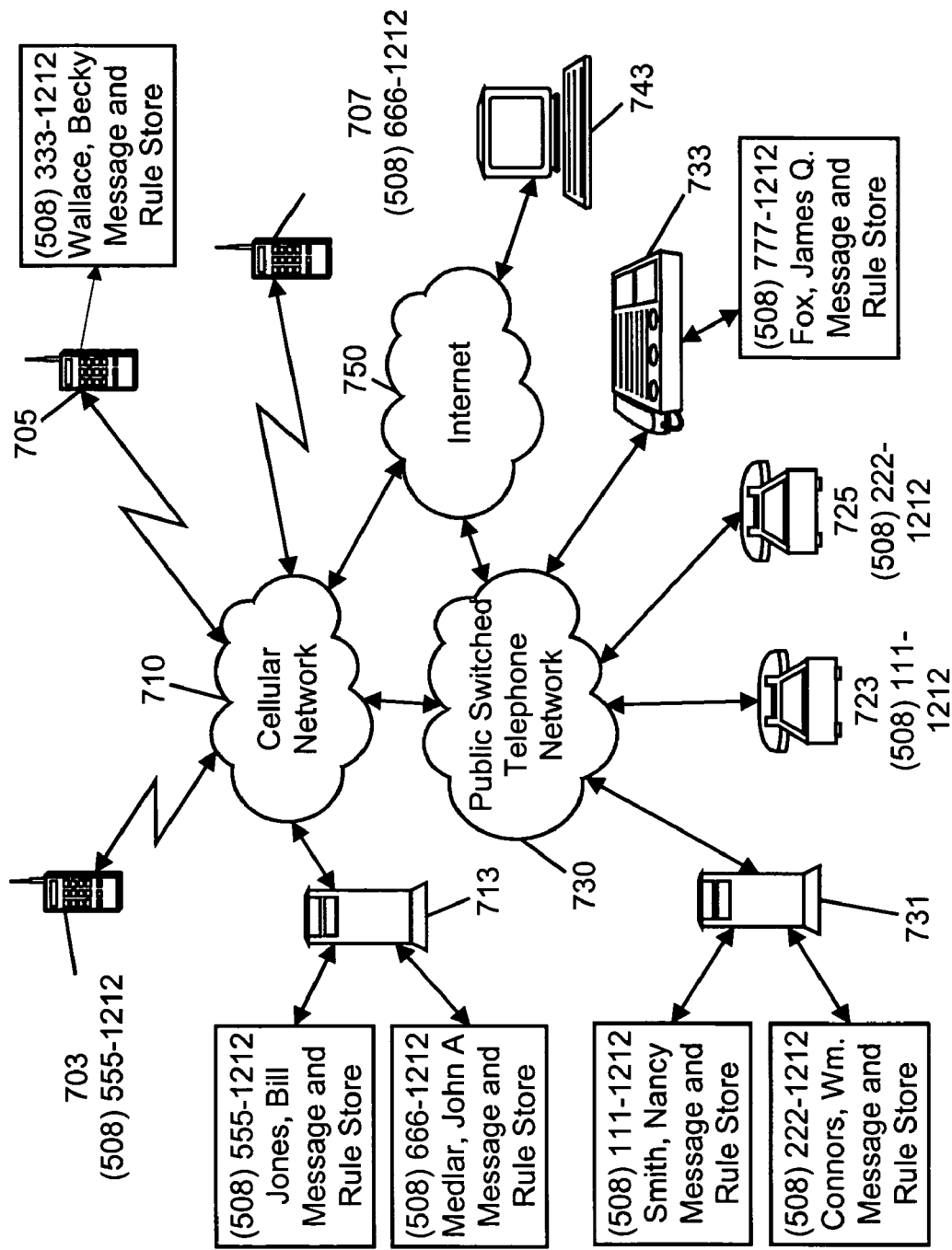
FIG. 7 is a network diagram showing the manner in which numerous cellular and conventional telephone stationset devices may be interconnected to exchange recorded messages and to execute conditional functions as contemplated by the invention.

As discussed above, the cellular handset may include internal storage for messages and rules as illustrated by the cellular handset 705 in FIG. 7. Alternatively, as illustrated by the cellular phones 703 and 707, a server operated by or connected to the cellular network may be used to store messages, rules and other data associated with individual cellular subscribers. Likewise, a server as illustrated at 731 at a telephone central office or otherwise connected to the public switched telephone network, such as the server that performs voice mail functions provided to subscribers by the telephone company, may be used to store messages and other files on behalf of telephone subscribers who may access those services using conventional telephone stationsets as seen at 723 and 725. Standalone answering systems may be connected to the PSTN as illustrated at 733 and may includes storage for message files, rules for triggering actions when certain conditions are satisfied, and other functions. Any or all of these devices may access the rich assortment of information and services, such as EPC network servers which provide tracking information on products, GIS servers which provide information for associating services, addresses, regions, etc. with GPS generated position data, and servers for providing location-based communications.

CONCLUSION

It is to be understood that the specific methods and apparatus that have been described are merely illustrative of applications of the principles of the invention. By way of example only, many of the illustrative implementations describe the use of a cellular handset, but those skilled in the art will readily recognize that the same functions could be implemented and used with wired telephone station sets, portable phones, PBX equipment, telephone central office and call management systems, and the like. Numerous modifications may be made to the described embodiments without departing from the true spirit and scope of the invention.

What is claimed is:

1. An on-demand voice mail system for recording messages transmitted via a telephone network from a remote party to a telephone stationset operated by a stationset user wherein said stationset comprises, in combination:

a communications port connecting said stationset to said telephone network for establishing a voice connection via said telephone network between said remote party and said stationset, a keypad for accepting control commands from said stationset user, a voice recorder, a memory storage unit for persistently storing messages recorded by said voice recorder, and a processor coupled to said communications port, said keypad, said voice recorder and said memory storage unit for:

responding to a request command accepted from said stationset user during a two-way voice conversation via said voice connection by employing said voice recorder to record an incoming message received from said remote party via said voice connection that is maintained after said stationset user hangs up the stationset or otherwise terminates said two-way voice conversation, storing said incoming message in said memory storage unit as an audio voice message file, and thereafter reproducing said audio voice message file as stored in said memory storage unit upon request by said stationset user.

2. The on-demand voice mail system as set forth in claim 1 wherein said telephone network is formed in whole or in pan by a cellular telephone network and wherein said stationset is a cellular handset.

3. The on-demand voice mail system as set forth in claim 2 wherein said cellular handset includes a display screen for displaying menu options and wherein said processor accepts the selection of one of said menu options from said stationset user using said keypad as said request command.

4. The on-demand voice mail system as set forth in claim 1 wherein:
   said memory storage unit stores a plurality of audio voice message files each of which is designated by a unique identifying label,
   said stationset further comprises a display responsive to a command entered by said stationset user using said keypad for displaying the identifying label designating each of said plurality of audio voice message files, and
   means responsive to a selection command entered by said stationset user using said keypad for designating a selected identifying label designating a selected one of said audio voice message files and for processing said selected one of said audio message files in a manner specified by stationset user.

5. The on-demand voice mail system as set forth in claim 4 wherein said stationset further comprises means for playing back said selected one of said audio voice message files for said stationset user.

6. The on-demand voice mail system as set forth in claim 4 wherein said stationset further comprises means for transmitting said selected one of said audio files via said communications port and said telephone network to said remote party.

7. The on-demand voice mail system as set forth in claim 4 wherein said telephone network is formed in whole or in part by a cellular telephone network and wherein said stationset operated by said stationset user is a cellular handset.

8. The on-demand voice mail system as set forth in claim 6 wherein said telephone network is formed in whole or in part by a cellular telephone network and wherein said stationset operated by said stationset user is a cellular handset.

9. The on-demand voice mail system as set forth in claim 7 wherein said stationset further comprises means for transmitting said selected one of said audio files via said communications port and said telephone network to a remotely located server for storage at said remotely located server.

10. The on-demand voice mail system as set forth in claim 7 wherein said request command is accepted when a second voice connection to a second remote party is pending after a call-waiting interruption and wherein, in response to said request, a two way conversation is established between said telephone user and said second remote party via said second voice connection while said voice recorder is recording said additional information.

11. The on-demand voice mail system as set forth in claim 1 further comprising means responsive to said request issued by said stationset user for terminating said two-way conversation for transmitting a pre-recorded greeting message to said remote party prior to connecting said remote party to said voice recorder.

12. The on-demand voice mail system as set forth in claim 11 further comprising means for acquiring caller identification information identifying said remote party and for selecting and transmitting said pre-recorded greeting message from a plurality of available messages based said caller identification information.

* * * * *